A. FOUGÈRE.
GANG CUTTER.
APPLICATION FILED NOV. 27, 1916.
1,218,389.                                    Patented Mar. 6, 1917.
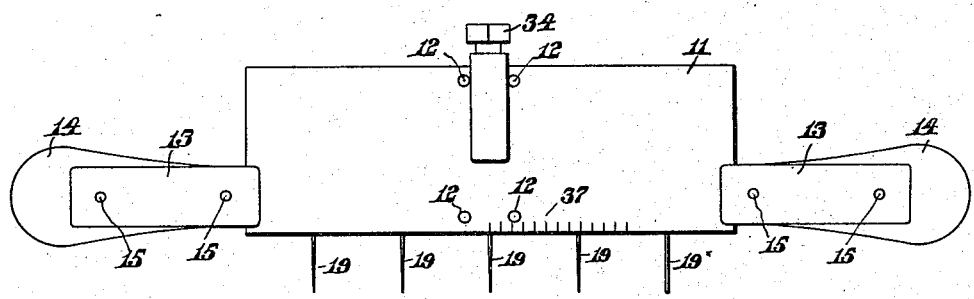
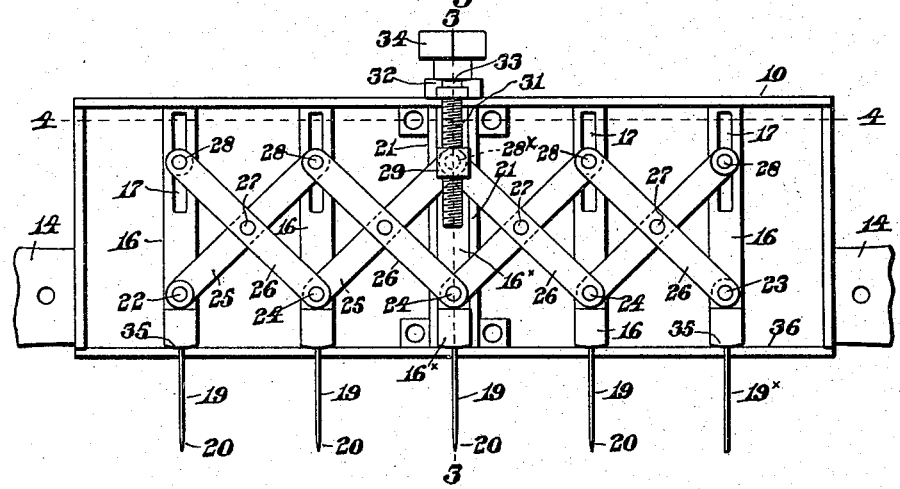
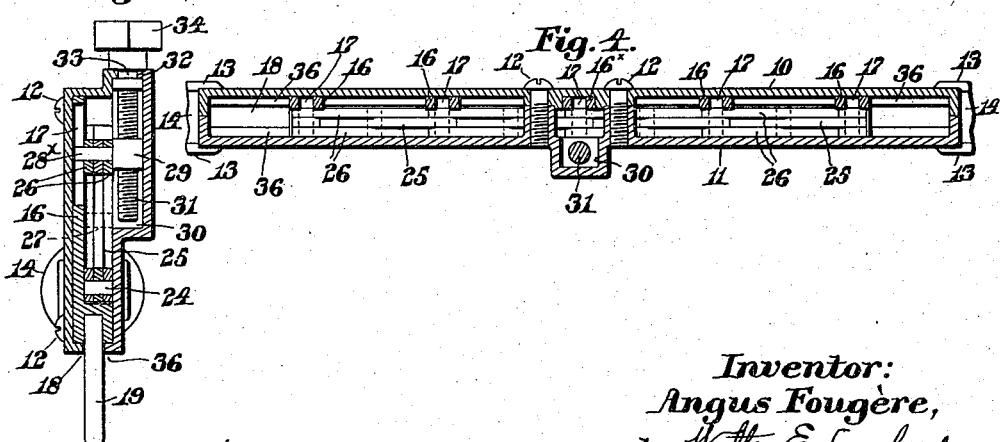
Inventor:
Angus Fougère,
by Walter E. Lombard,
Atty.

UNITED STATES PATENT OFFICE.

ANGUS FOUGÈRE, OF CAMBRIDGE, MASSACHUSETTS.

GANG-CUTTER.

1,218,389. Specification of Letters Patent. Patented Mar. 6, 1917.

Application filed November 27, 1916. Serial No. 133,983.

*To all whom it may concern:*

Be it known that I, ANGUS FOUGÈRE, a citizen of the United States of America, and a resident of Cambridge, in the county of Middlesex and Commonwealth of Massachusetts, have invented certain new and useful Improvements in Gang-Cutters, of which the following is a specification.

This invention relates to gang cutters particularly adapted to cut candy or some similar material into strips of equal width.

The particular object of the invention is to provide a device of this character with means whereby the various knives may be quickly and simultaneously separated from each other to any desired degree in order to vary the widths of the strips being cut.

The invention consists in a fixed knife and movable knives on opposite sides thereof, all of said knives being connected together by instrumentalities adapted to move said movable knives toward and from said fixed knife and retain them in adjusted position at equal distances apart.

The invention further consists in certain novel features of construction and arrangement of parts which will be fully understood by reference to the description of the drawings and to the claims hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized and that the invention is not limited to the precise arrangement and organization of these instrumentalities as herein shown and described.

Of the drawings:

Figure 1 represents an elevation of a device embodying the principles of the present invention.

Fig. 2 represents an enlarged elevation of a portion of the same with the closing plate removed.

Fig. 3 represents a transverse vertical section of same on line 3—3 on Fig. 2, and Fig. 4 represents a horizontal section of same on line 4—4 on Fig. 2.

Similar characters designate like parts throughout the several figures of the drawings.

In the drawings, 10 is a casing provided with a cover plate 11 secured thereto by means of the screws 12. Said casing 10 and cover plate 11 are each provided at opposite ends thereof with projecting plates 13 between each pair of which is interposed a handle 14. Said handles and plates are secured together by means of the screws 15.

The casing 11 is preferably rectangular, and has disposed in the inner chamber thereof a plurality of bars 16, the upper end of each of which is provided with a slot 17 extending longitudinally thereof. The lower end of the casing 10—11 is provided with a slot 18 extending longitudinally of said casing.

Each bar 16 is provided with a thin plate 19 extending downwardly through the slot 18. One of these plates $19^\times$ is blunt at its lower end and serves as a guide member. The other plates 19 are sharpened at their lower ends as indicated at 20 and serve as knives adapted to cut through confections or any similar material. The central bar $16^\times$ is positioned in a groove formed by parallel ribs 21 extending inwardly from the inner face of the casing 10. These ribs 21 prevent any movement of the central bar $16^\times$.

Near the lower end of each of the outer bars 16 are pivot members 22 and 23, and near the lower end of each of the intermediate bars 16—$16^\times$ are similar pivot members 24. The pivot member 22 and the pivot members 24 extend through openings in the lower ends of a plurality of parallel members or connectors 25, while the pivot member 23 extends through the lower end of a member or connector 26 and the pivot members 24 also extend through other members or connectors 26 parallel thereto. The members 25 and 26 are pivoted together at 27 midway of their length. Each of the members 25 and 26 is provided with a projecting member 28 at its upper end, each of said projecting members extending into one of the slots 17 at the upper ends of the bars 16 and $16^\times$.

The central projecting member $28^\times$ has formed on its outer end a block 29 extending into a vertical recess 30 formed in the cover plate 11. This block 29 is adapted to be moved longitudinally of said recess 30 by means of the screw 31 extending through said block and threaded thereto. End movement of said screw member 31 is prevented by means of the flange 32 extending into an annular groove 33 formed in said screw member 31, as indicated in Fig. 2 of the drawings.

The upper end of the screw member 31 is provided with a head 34 by which said screw member may be turned as desired.

The lower ends of the bars 16—16× are preferably curved as indicated at 35, thereby reducing the surface in contact with the flange 36 formed on the inner faces of the casing 10 and the cover plate 11.

It is obvious that by turning the screw member 31 the block 29 will be moved longitudinally of the recess 30×, and thereby change the inclinations of the members 25 and 26. As the inclination of these members 25 and 26 is changed, the bars 16 will be moved toward and from the central bar 16×. It is obvious, therefore, that by this operation the knives 19 and guide member 19× may be moved toward and from each other as desired, any desired interval being thus obtainable.

The exact interval may be determined by means of a scale 37 on the outer face of the casing 10 or cover plate 11.

Preferably the members 26 are disposed in pairs with the members 25 pivoted thereto between the members of each pair, all as shown in the drawings, but it is self-evident that a single member 26 might be used instead of the pair of members as shown.

By means of this device a sheet of confection such as fudge may be readily cut into long strips, and then by quick adjustment of the knives and a movement in a direction perpendicular to the former movement of the device, these strips may be subdivided in any desired length. It is also obvious that in various kinds of confections strips of different widths are desired and by the use of this gang cutter the knives may be readily adjusted for use in connection with the various classes of confection.

It is believed that the operation and many advantages of this invention will be fully understood from the foregoing description.

Having thus described my invention, I claim:

1. In a device of the class described, a casing; a fixed bar extending transversely thereof; a knife secured thereto and projecting from said casing; movable bars on opposite sides of said fixed bar; a knife projecting from each movable bar; and means for simultaneously moving said movable bars equal distances from said fixed bar and from each other.

2. In a device of the class described, a casing; a fixed bar extending transversely thereof; a knife secured thereto and projecting from said casing; movable bars on opposite sides of said fixed bar; a knife projecting from each movable bar; connectors pivotally connected to said bars and pivoted together in pairs; and means for varying the inclination of said connectors.

3. In a device of the class described, a casing; a fixed bar extending transversely thereof and having a slot in one end thereof; a knife secured thereto and projecting from said casing; movable bars on opposite sides of said fixed bar, each having a slot in one end thereof; a knife projecting from each movable bar; connectors pivoted together in pairs and each pivoted at one end to a knife bar; a member on the opposite end of each connector positioned in one of said slots; and means for varying the inclinations of said connectors.

4. In a device of the class described, a casing; a fixed bar extending transversely thereof and having a slot in one end thereof; a knife secured thereto and projecting from said casing; movable bars on opposite sides of said fixed bar, each having a slot in one end thereof; a knife projecting from each movable bar; connectors pivoted together in pairs and each pivoted at one end to a knife bar; a member on the opposite end of each connector positioned in one of said slots; a block on one of said projecting members; and means coacting with said block for varying the inclinations of said connectors.

5. In a device of the class described, a casing; a fixed bar extending transversely thereof and having a slot in one end thereof; a knife secured thereto and projecting from said casing; movable bars on opposite sides of said fixed bar, each having a slot in one end thereof; a knife projecting from each movable bar; connectors pivoted together in pairs and each pivoted at one end to a knife bar; a member on the opposite end of each connector positioned in one of said slots; a nut on one of said projecting members; and a screw threaded to said nut and adapted to vary the inclinations of said connectors.

6. In a device of the class described, a casing; a fixed bar extending transversely thereof and having a slot in one end thereof; a knife secured thereto and projecting from said casing; movable bars on opposite sides of said fixed bar, each having a slot in one end thereof; a knife projecting from each movable bar; connectors pivoted together in pairs and each pivoted at one end to a knife bar; a member on the opposite end of each connector positioned in one of said slots; a nut on one of said projecting members; a screw threaded to said nut and adapted to vary the inclinations of said connectors; and means preventing end movement of said operating screw.

7. In a device of the class described, a casing; a fixed bar extending transversely thereof and having a slot in one end thereof; a knife secured thereto and projecting from said casing; movable bars on opposite sides of said fixed bar, each having a slot in one end thereof; a knife projecting from each movable bar; connectors pivoted together in pairs and each pivoted at one end to a knife bar; a member on the opposite end of each connector positioned in one of said slots; a nut on one of said projecting members; a screw threaded to said nut and adapted to vary the inclinations of said connectors; and a guide groove in said casing for said nut.

Signed by me at 4 Post Office Sq., Boston, Mass., this 20th day of November, 1916.

ANGUS FOUGÈRE.

Witnesses:
 WALTER E. LOMBARD,
 NATHAN C. LOMBARD.

Copies of this patent may be obtained for five cents each, by addressing the "Commissioner of Patents, Washington, D. C."